(12) United States Patent
Warren et al.

(10) Patent No.: US 9,395,795 B2
(45) Date of Patent: Jul. 19, 2016

(54) SYSTEM POWER MANAGEMENT USING COMMUNICATION BUS PROTOCOLS

(71) Applicant: Apple Inc., Cupertino, CA (US)

(72) Inventors: David S. Warren, Campbell, CA (US);
Inna Levit, Sunnyvale, CA (US);
Timothy R. Paaske, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 367 days.

(21) Appl. No.: 14/032,335

(22) Filed: Sep. 20, 2013

(65) Prior Publication Data

US 2015/0089259 A1    Mar. 26, 2015

(51) Int. Cl.
*G06F 1/32*          (2006.01)
*G06F 1/08*          (2006.01)

(52) U.S. Cl.
CPC ............... *G06F 1/3237* (2013.01); *G06F 1/08* (2013.01); *G06F 1/325* (2013.01); *Y02B 60/1221* (2013.01); *Y02B 60/32* (2013.01)

(58) Field of Classification Search
CPC ......... G06F 1/08; G06F 1/3237; G06F 1/325; Y02B 60/32; Y02B 60/1221
See application file for complete search history.

(56) References Cited

U.S. PATENT DOCUMENTS

| | | | | |
|---|---|---|---|---|
| 7,571,335 B2 * | 8/2009 | Lee | ..................... | G06F 1/3203 713/323 |
| 8,112,651 B2 * | 2/2012 | Wang | ..................... | G06F 1/3209 710/14 |
| 8,209,479 B2 | 6/2012 | Rajan et al. | | |
| 2004/0128576 A1 | 7/2004 | Gutman | | |
| 2006/0218426 A1 | 9/2006 | Gutman et al. | | |
| 2008/0307240 A1 * | 12/2008 | Dahan | ..................... | G06F 1/06 713/320 |
| 2009/0077394 A1 | 3/2009 | Tsai et al. | | |
| 2010/0115117 A1 | 5/2010 | Diab et al. | | |
| 2011/0314314 A1 * | 12/2011 | Sengupta | ..................... | G06F 1/3228 713/323 |
| 2012/0324265 A1 | 12/2012 | Jeyaseelan | | |
| 2013/0007483 A1 | 1/2013 | Diefenbaugh et al. | | |

(Continued)

FOREIGN PATENT DOCUMENTS

| | | |
|---|---|---|
| CN | 101800814 A | 8/2010 |
| TW | 200818669 A | 4/2008 |
| TW | 200933356 A | 8/2009 |

OTHER PUBLICATIONS

Written Opinion in application No. PCT/US2014/50744 issued Apr. 24, 2015.

(Continued)

*Primary Examiner* — Thuan Du
(74) *Attorney, Agent, or Firm* — Meyertons, Hood, Kivlin, Kowert & Goetzel, P.C.

(57) ABSTRACT

Embodiments of an apparatus and method are disclosed that may allow for managing power of a computing system. The apparatus may include a clock generation circuit, a bus interface unit, and a control circuit. The clock generation circuit may be configured to generate multiple clock signals. Each clock signal may provide a timing reference to different functional blocks within a device coupled to the communication bus. The bus interface unit may be configured to receive messages from the device via the communication bus. The messages may include a latency value and a request to activate a low power mode. The control circuit may be configured to deactivate one or more of the multiple clock signals dependent upon the latency value and multiple threshold values.

20 Claims, 6 Drawing Sheets

(56) References Cited

U.S. PATENT DOCUMENTS

2013/0166864 A1 6/2013 Yerushalmi et al.
2013/0198538 A1 8/2013 Diab et al.
2013/0290758 A1* 10/2013 Quick ................ G06F 1/3203
  713/323

OTHER PUBLICATIONS

Search Report in application No. PCT/US2014/50744 issued Apr. 24, 2015.

Anonymous: "Pushing the Frontier in Managing Power in Embedded ASIC or SoC Design with PCI Express", , Sep. 4, 2013, XP055179813, Retrieved from the Internet: URL:http://web.archive.org/web/20130904042449/http://www.design-reuse.com/articles/17192/pci-express-managingpower.html [retrieved on Mar. 27, 2015].

Office Action in ROC (Taiwan) Patent Application No. 103128692 issued Jul. 29, 2015.

International Preliminary Report on Patentability and Written Opinion in application No. PCT/US2014/50744 issued Mar. 31, 2016, 8 pages.

* cited by examiner

SYSTEM POWER MANAGEMENT USING COMMUNICATION BUS PROTOCOLS

BACKGROUND

1. Technical Field

This invention is related to the field of power management in computing systems, and more particularly system clock gating techniques.

2. Description of the Related Art

Computing systems typically include a number of interconnected integrated circuits or devices. In some cases, the integrated circuits may communicate through parallel interfaces, which simultaneously communicate multiple bits of data. In other cases, the integrated circuits may employ a serial interface, which sequentially communicates one bit of data at a time. For both parallel and serial interfaces, communicated data may be differentially encoded.

In some cases, the integrated circuits or devices within a computing system may communicate over the serial or parallel interfaces using one of various communication protocols. Such protocols may allow for the transmission of messages between various components of the computing system in addition to the transmission of data. The transmitted messages may include reports of levels of activity, requests for specific modes of operation, and the like.

During operation of a computing system, some components of the computing system may experience periods of time of limited or no use. Such periods of limited use may be used to conserve or reduce power by disabling portions of circuitry associated with an idle component. For example, circuits relating to the transmission of data on a communication bus (commonly referred to as "interface circuits," "physical layer circuits," or "PHYs") may be disabled to reduce the power consumed the computing system.

SUMMARY OF THE EMBODIMENTS

Various embodiments of an apparatus and method for managing power of a computing system are disclosed. Broadly speaking, an apparatus and method are contemplated in which a clock generation circuit may be configured to generate first and second clock signals. The first clock signal may provide a timing reference to an interface unit of a device, and the second clock signal may provide a timing reference to one or more logic blocks of the device. A bus interface unit coupled to a communication bus may be configured to receive a message and a request signal from the device. The message may include a latency value. A control circuit may be configured deactivate the first clock signal in response to a determination that the latency value is greater than a first threshold value and less than a second threshold value, and deactivate the first clock signal and the second clock signal responsive to a determination that the latency value is greater than the second threshold value.

In one embodiment, the latency value may include a latency number and a scale factor. In a further embodiment, the control circuit may be further configured to multiply the latency number by the scale factor.

In a specific embodiment, the control circuit may be further configured send an acknowledge signal to the device responsive dependent upon a comparison of the latency value to the first threshold value and the second threshold value.

BRIEF DESCRIPTION OF THE DRAWINGS

The following detailed description makes reference to the accompanying drawings, which are now briefly described.

Figure 1:
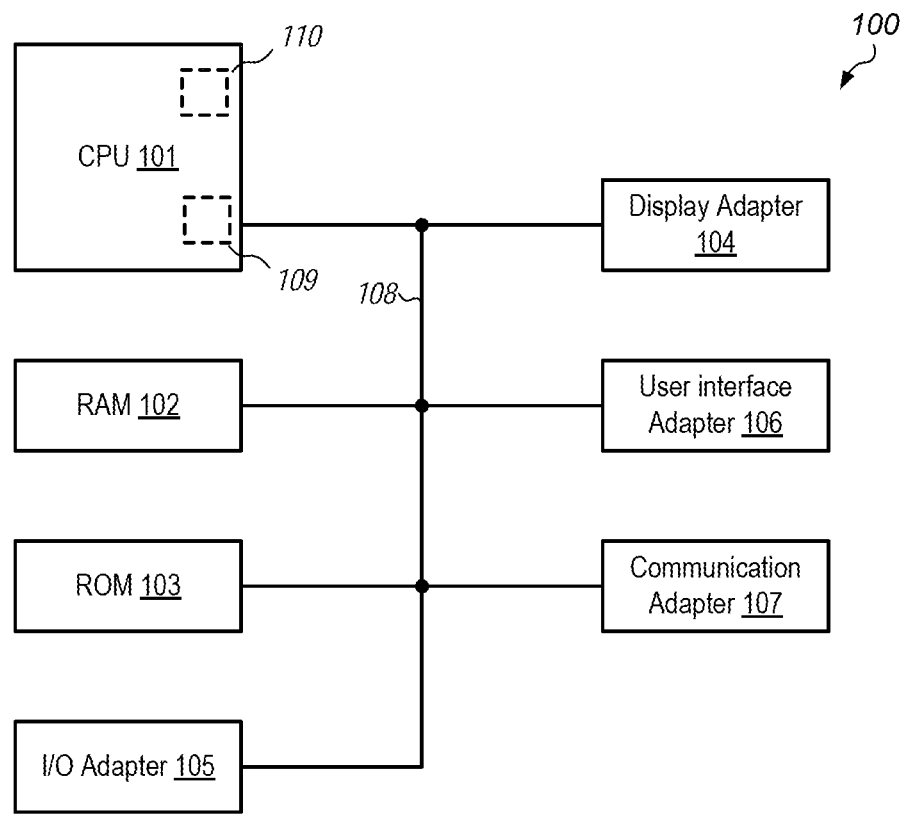
FIG. 1 illustrates an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

A computing system may include one or more integrated circuits or components, such as, e.g., a central processing unit (CPU). Each one of the integrated circuits may communicate through either a serial or parallel interface. In a parallel interface, multiple data bits are communicated simultaneously, while in a serial interface, data is communicated as a series of sequential single data bits. A serial or parallel interface may employ one of various communication protocols that allow the transmission of data and messages between the various integrated circuits of the computing system.

Various components of a computing system may experience periods of inactivity during the course of operating the computing system. During such periods of inactivity, portions of the inactive components may be disabled or deactivated in order place the inactive component into a low power mode, thereby be reducing the power consumption of the computing system. In particular, circuits that consume DC power, such as, e.g., analog amplifiers with included bias circuits, may be disabled. Such circuits, however, may take a period of time before being ready to use once re-enabled. The period of time required by a component to resume operation is commonly referred to as "latency."

In some computing system, components may communicate their latency to resume powered operation, thereby allowing the computing system to decide if powering down a given component is possible. For example, an individual component may not have knowledge of future instructions or tasks to be performed, and, therefore, cannot make an informed decision as to whether activate a low power mode. Other components in the computing system, however, may have knowledge of further instructions or tasks to be performed and may assist in determining if a power savings is acceptable in light of the latency required to return component(s) in a low power mode to an fully powered state.

In some situations, however, only selected portions of a component of the computing system may be deactivated upon entry into a low power mode, thereby limiting the potential power savings. The embodiments illustrated in the drawings and described below may provide techniques for allowing additional power savings within a computing system.

A block diagram of a computing system is illustrated in FIG. 1. In the illustrated embodiment, the computing system 100 includes a CPU 101 coupled to Random Access Memory (RAM) 102, Read-only Memory (ROM) 103, and display adapter 104. CPU 101 is additionally coupled to input/output (I/O) adapter 105, user interface adapter 106, and communications adapter 107. In various embodiments, computing system 100 may be configured as a desktop system, a laptop system, or in any suitable form factor.

RAM 102 may include any suitable type of memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. It is noted that although one RAM is shown, in various embodiments, any suitable number of RAMs may be employed.

CPU 101 may implement any suitable instruction set architecture (ISA), such as, e.g., the ARM™, PowerPC™, or x86 ISAs, or combination thereof. In some embodiments, CPU 101 may include one or more processor cores configured to implement one of the aforementioned ISAs. CPU 101 may also include one or more cache memories which may be configured to store instructions and/or data during operation. In other embodiments, CPU 101 may include power management unit 110 which may be configured to process and manage requests for changes in the power status of system 100. For example, power management unit 110 may respond to a system request for entry into sleep mode by generating a sleep mode signal that may cause portions of CPU 101, such as bus transceiver unit 109, for example, to power down. In some embodiments, power management unit 110 may coordinate the orderly power up of CPU 101 by generating one or more power up signals each of which may activate a different portion of the circuits within CPU 101.

CPU 101 may include one or more bus transceiver units 109 that allow CPU 101 to connect to bus 108. In some embodiments, bus 108 may be a high-speed serial interface that may conform to an industry standard specification, such as, e.g., PCI Express™, or MIPI Physical Layer. In some embodiments, the various circuits block, such as, e.g., CPU 101, may be coupled to bus 108 through a capacitor (this is commonly referred to as being "AC coupled").

ROM 103 may be configured to store instructions to be executed by CPU 101. In some embodiments, ROM 103 may store instructions necessary for initial boot-up and configuration of CPU 101. The stored instructions may include, in some embodiments, instructions to perform a power-on self-test (POST) that may allow CPU 101 to test embedded cache memories and other circuit blocks that may reside on CPU 101. In some embodiments, ROM 103 may be mask-programmable using a metal, polysilicon, contact, implant, or any suitable mask layer available on a semiconductor manufacturing process.

I/O adapter 105 may be configured to coordinate data transfer between CPU 101 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O adapter 105 may be configured to implement a version of Universal Serial Bus (USB) protocol or IEEE 1394 (Firewire®) protocol.

Communication adapter 107 may be configured to coordinate data transfer between CPU 101 and one or more devices (e.g., other computer systems) coupled to CPU 101 via a network. In one embodiment, communication adapter 107 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, communication adapter 107 may be configured to implement multiple discrete network interface ports.

User interface adapter 106 may be configured to transfer data between one or more peripheral devices configured to input data into computing system 100. In one embodiment, user interface adapter 106 may receive input from a keyboard and transfer the data to CPU 101. In other embodiments, user interface adapter 106 may receive and format data from a mouse or other suitable pointing device.

Display adapter 104 may be configured to transfer and format data from between CPU 101 and a display screen. In some embodiments, display adapter 104 may be configured to implement a display standard such as Super-VGA or High-Definition Multimedia Interface (HDMI). In other embodiments, display adapter 104 may be configured to implement multiple display interfaces.

It is noted that the computing system illustrated in FIG. 1 is merely an example. In other embodiments, different components and different numbers of communication busses may be employed.

Figure 2:
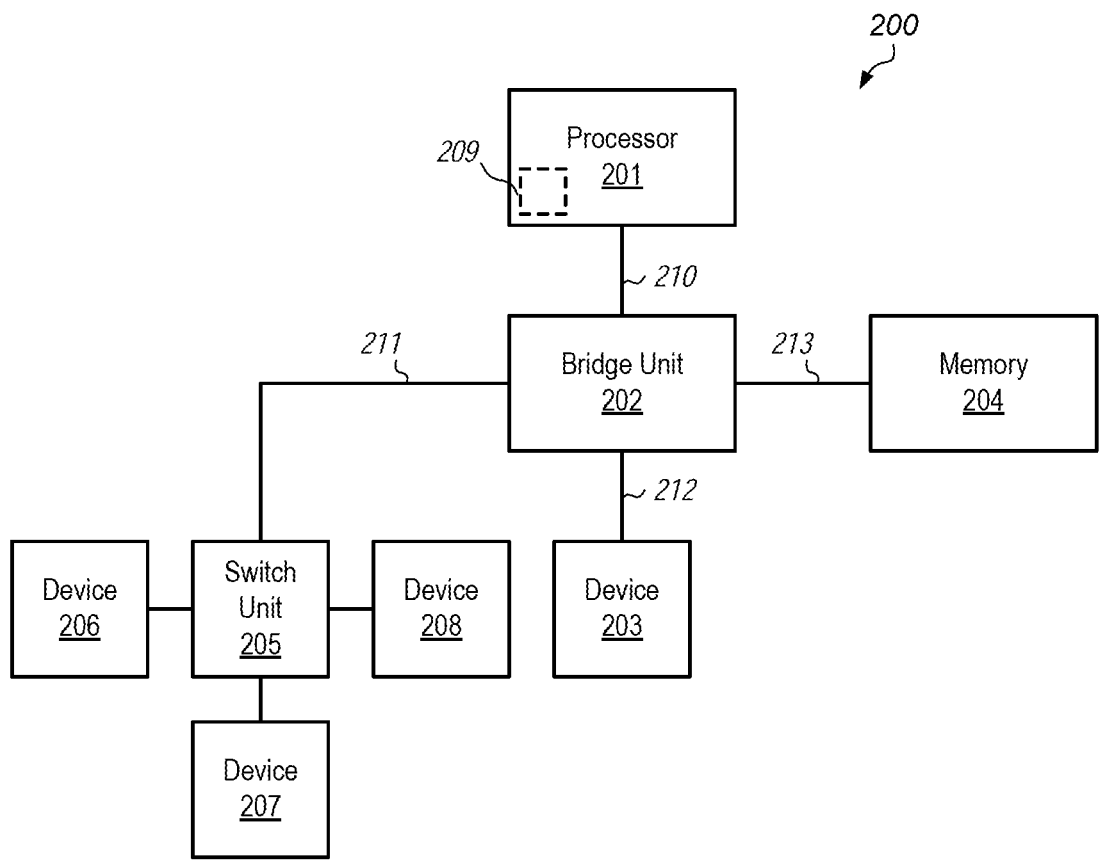
FIG. 2 illustrates another embodiment of a computing system.

Turning to FIG. 2, another embodiment of a computing system is illustrated. In the illustrated embodiment, computing system 200 includes processor 201, bridge unit 202, memory 204, device 203, switch unit 205, and devices 206 through 208. Processor 201 includes register 209 which may, in various embodiments, be accessed in response to program instructions stored in memory 204, or other memory or storage device (not shown), and executed by processor 201. In some embodiments, executed program instructions may store one or more data bits into register 209, and the stored data bits may be employed by processor 201 in determining one or more system settings, such as, e.g., latency thresholds.

It is noted that registers such as those shown and described herein, may be particular embodiments of a storage circuit configured to store one or more data bits. Registers may be design in accordance with various design styles, and may include one or more latches, flip-flops, or any other suitable storage circuit.

Devices 203, 206, 207, and 208 may, in various embodiments, corresponding to any of components 102 through 107 of computing system 100 as illustrated in FIG. 1. In some embodiments, communication busses may terminate at devices 203, 206, 207 and 208. In such cases, devices 203, 206, 207, and 208 may be referred to as "endpoints" or "endpoint devices."

Processor 201 is coupled to bridge unit 202 via communication bus 210. Bridge unit 210 is coupled to memory 204, device 203, and switch unit 205 via communication busses 213, 212, and 211, respectively. In various embodiments, each of communication busses 210, 211, 212, and 213 may each employ a different communication protocol. Bridge unit 202 may, in some embodiment, translate one communication protocol to another. For example, bridge unit 202 may translate requests made by processor 201 using the communication protocol employed on communication bus 210 to the communication protocol employed on communication bus 213.

Switch unit 205 may, in various embodiments, direct messages sent by processor 201 through bridge unit 202 to one of devices 206, 207, and 208. In some embodiments, switch unit 205 may also steer any responses from devices 206, 207, and 208 back to bridge unit 202.

During operation, one or more transactions, i.e., a request and an accompanying reply, may be transmitted between different components of system 200. For example, processor 201 may request values stored in memory 204, and in response to the request memory 204 may send the requested data back to processor 201 via communication busses 213 and 210. In some embodiments, different transactions may exist on a communication bus in parallel. While the initiator of a request, such as, e.g., processor 201, is awaiting a response to a request, the initiator may receive a response to a previous request, or transmit a new request.

Individual devices, such as, e.g., device 203, may monitor their respective levels of activity. During periods of inactivity, a device may signal a host device, such as, e.g., processor 201, that the device is idle and may request of the host device to activate a low power mode. The host device may, in various embodiments, be monitoring overall system activity, and may response to the request for activation of the low power mode. Individual devices may also transmit information regarding device configuration settings.

It is noted that the computing system illustrated in FIG. 2 is merely an example. In other embodiments, different numbers of communication busses and different communication protocols are possible and contemplated.

Figure 3:
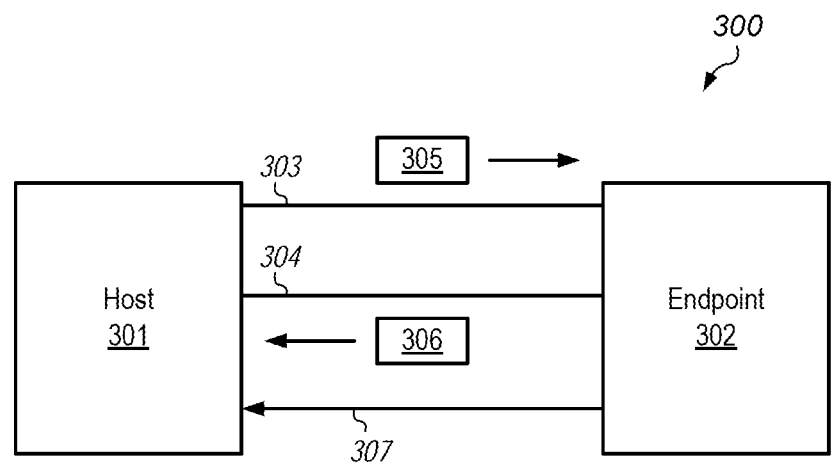
FIG. 3 illustrates an embodiment of two components of a computing system transmitting packets via a communication bus.

Another embodiment of a computing system is illustrated in FIG. 3. In the illustrated, computing system 300 includes host device 301 and endpoint device 302. In some embodiments, host device 301 may correspond to processor 201 as depicted in FIG. 2, and endpoint device 302 may correspond to any devices 206, 207, 208 and 203 as illustrated in FIG. 2. Host device 301 is coupled to endpoint device 302 via communication busses 303 and 304. Although a single wire is depicted for each of communication busses 303 and 304, in other embodiments, different numbers of wires may be employed. Communication bus 303 and communication bus 304 may, in various embodiments, employ any one of numerous communication protocols.

In some embodiments, endpoint device 302 may send message 306 to host device 301 via communication bus 304. Message 306 may include one or more packets of data, and may be encoded in a manner consistent with the communication protocol being employed by communication bus 304. In various embodiments, message 306 may include data in response to a request from host device 301, configuration information detailing capabilities of endpoint device 302, operational information regarding endpoint device 302, or any other suitable information. Operational information may, in some embodiments, include information regarding an activity level of the endpoint device 302, or latency information indicating how long endpoint device 302 will require to upon exiting a low power mode before the device is ready to perform its function.

Endpoint device 302 may, in various embodiments, signal a request to host device 301 using signal wire 307. In some embodiments, the request may include a request to enter a low power mode. Although a single signal wire is depicted in computing system 300, it is noted that in various embodiments, different numbers of signal wires may be employed. Such wires may, in other embodiments, be used to indicate specific conditions and requests between host device 301 and endpoint device 302.

Host device 301 may send message 305 to endpoint device 302 via communication bus 303. As described above in regarding to message 306, message 305 may be encoded using the communication protocol employed by communication bus 303. Message 305 may, in various embodiments, include data or instructions to be sent to endpoint device 302, or various responses to message 306 received by host device 301. For example, message 306 may include a request for endpoint device 302 to enter a low power mode, and message 305 may include an acknowledgment of the request. In some embodiments, host device 301 may check various parameters, such as, e.g., pending instructions and tasks, before acknowledging the request for activation of the low power mode of endpoint device 302. Dependent upon the checked parameters, host device 301 may not acknowledge the request to activate the low power mode, in which case, endpoint device 302 may continue in normal operation.

As will be described below in more detail, a low power mode of endpoint device 302 may include disabling one or more functional blocks within endpoint device 302. For example, in some embodiments, internal clock signals to one or more functional blocks not currently be used, may be stopped, thereby saving dynamic switching power associated with the clocks and the functional blocks. In other embodiments, power supplies internal to endpoint device 302 may be set to a low voltage level or ground potential thereby saving leakage power associated with the one or more functional blocks within endpoint device 302.

Although only two devices are depicted in FIG. 3, it is noted that, in other embodiments, different numbers of devices may be employed. It is further noted that different numbers of communication busses may also be employed.

Figure 4:
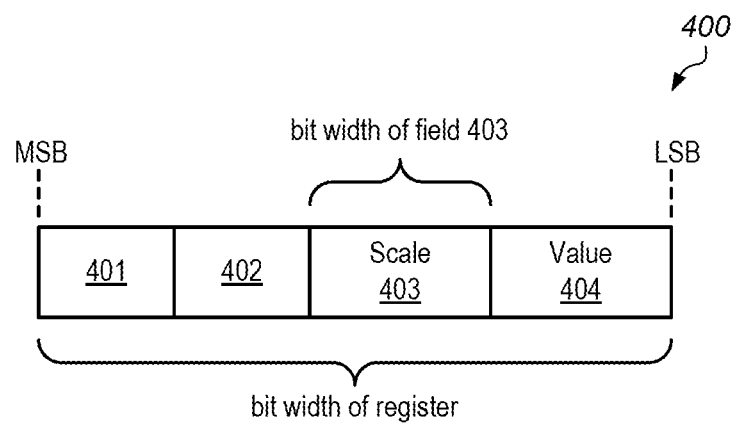
FIG. 4 illustrates an embodiment register configured to store latency information.

Turning to FIG. 4, an embodiment of a register configured to store latency information is illustrated. In some embodiments, register 400 may correspond to register 209 of processor 201 as illustrated in FIG. 2 and may be configured to store information relating a latency threshold value. Register 400 may in some embodiments include a 16-bits of data, and the Least-Significant-Bit (LSB) of the register may the "right-most" bit of the register, and the Most-Significant-Bit (MSB) of the register may be the "left-most" bit of the register. Each bit of register 400 may be stored in a latch or flip-flop circuit, each of which may designed in accordance with one of various design styles. For example, in some embodiments, each data bit of register 400 may be stored in a dynamic latch circuit.

In the illustrated embodiment, register 400 includes data fields 401 through 404. Each data field of data fields 401 through 404 may be configured to store a different type of data. For example, data field 404 may be configured to a latency number and data field 403 may be configured to store a scale factor. It is noted that in the illustrated embodiment, data fields 401 and 402 are not used, although in other embodiments, data fields 401 and 402 may be employed to store data. In some embodiments, a latency number may be a positive integer ranging from 0 to 9. The latency number may be encoded in a binary format and the resultant bits may be stored in the respective bits of register 400 that are included in data field 404.

In some embodiments, the scale factor may be encoded as a 3-bit binary number and stored in register bits corresponding to data field 403. The encoded number may, in various embodiments, correspond to a different time values, such as, e.g., 1 nanosecond. In other embodiments, all possible 3-bit binary encoding may not be used and such values may be disallowed.

The contents of register 400 may be set by a series of program instructions executed by a processor such as, e.g., processor 201 of computing system 200 as illustrated in FIG. 2. The program instructions may be executed during an initial setup phase of the computing system, or any other suitable configuration period. Once values have been loaded in register 400 by the execution of the program instructions, the processor may use the latency number and scale factor to determine a latency threshold. The latency threshold may, in some embodiments, be used to determine if certain power savings measures, such as, e.g., disabling a clock signal, may be enabled.

It is noted that the register illustrated in FIG. 4 is merely an example. In other embodiments, different numbers of fields and different bit width for each field may be employed.

Figure 5:
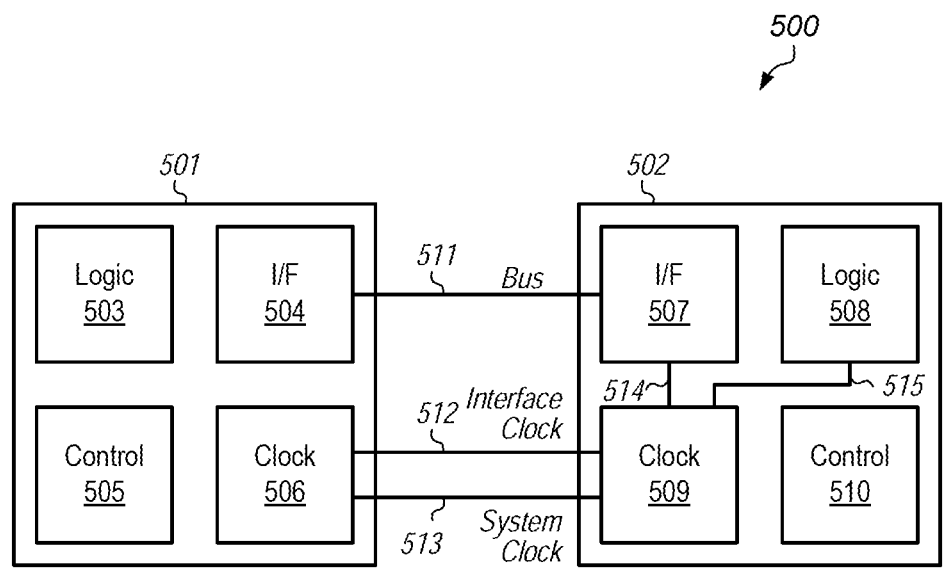
FIG. 5 illustrates an embodiment another embodiment of two components of a computing system.

Another embodiment of a computing system is illustrated in FIG. 5. In the illustrated embodiment, computing system 500 includes device 501 and device 502. Device 501 includes logic block 503, interface unit 504, control circuit 505, and clock generator unit 506. Device 502 includes logic block 508, interface unit 507, control circuit 510, and clock unit 509. Interface unit 504 is coupled to interface unit 507 via communication bus 511, and clock generator unit 506 is coupled to unit 509 via interface clock signal 512 and system clock signal 513.

In some embodiments, logic blocks 503 and 508 may be designed in accordance with one of various design styles. Logic blocks 503 and 508 may, in some embodiments, include general purpose processors configured to execute program instructions stored in a memory. In other embodiments, logic blocks 503 and 508 may include application specific state machines or sequential logic circuits configured to perform dedicated tasks. Logic block 503 may receive a clock signal from clock generator unit 506, and logic block 508 may receive internal clock signal 515 from clock unit 509. In some embodiments, clock unit 509 may generate internal clock signal 515 using system clock 513 as a timing reference. Logic block 508 may, in other embodiments, directly use system clock 513 as a timing reference.

Interface units 504 and 507 may, in various embodiments, be configured to transmit and receive message via a communication bus, such as, e.g., communication bus 511. In some embodiments, interface units 504 and 507 may encode messages internal to devices 501 and 502, respectively, into a format compatible with a communication protocol employed by communication bus 511. Interface units 504 and 507 may transmit data bits across communication bus 511 using one of various transmission techniques. For example, interface units 504 and 507 may employ differential signaling, where each data bit to be transmitted is encoded into two data bits and transmitted using two wires. In some embodiments, interface unit 504 and interface unit 507 may operate at different power supply voltage levels. In such cases, interface units 504 and 507 may employ voltage level translation circuits, amplifiers operating with different bias voltage levels, or any other suitable level translation circuit or method.

In some embodiments, additional signal wires (not shown) may be coupled between interface unit 504 and 507. Such signal wires may be used to send and receive specific requests between devices 501 and 502. For example, device 502 may request activation of low power mode by asserting one of a set of dedicated signal wires.

Interface unit 507 may, in some embodiments, receive internal clock signal 514 from unit 509. In some embodiments, clock unit 509 may generate internal clock signal 514 using interface clock 512 as a timing reference. Interface unit 508 may, in other embodiments, directly use interface clock 512 as a timing reference.

Clock generator unit 506 may, in various embodiments, be configured to generate one or more clock signals. In some embodiments, clock generator unit 506 may include a crystal oscillator, voltage-controller oscillator, or any other suitable oscillator circuit. Clock generator unit 506 may also include a phase-locked loop (PLL), delay-locked loop (DLL), or any other suitable phase locking circuit. In various embodiments, clock unit 506 may be configured to provide clock signals to functional blocks internal to device 501. Additionally, clock generator unit 506 may also be configured to provide one or more external clocks to other devices, such as, e.g., device 502. External clocks, such as, e.g., interface clock 512 and system clock 513, may be used directly by a receiving device, or the receiving device may use the received clock signal as a time reference for generator additional clock signals, such as, internal clocks 514 and 515, for example. In various embodiments, each external clock may have different frequencies, and clock generator unit 506 may be configured to disable or stop any given subset of the external clocks. Although only two external clocks are depicted in the embodiment illustrated in FIG. 5, in other embodiments, additional external clocks signals operating at varying frequencies may be employed.

Clock unit 509 may, in various embodiments, be configured to receive one or more external clocks (also referred to herein as a "reference clocks") and generate a corresponding one or more internal clocks dependent upon the received reference clocks. In some embodiments, clock unit 509 may include a PLL, DLL, or any other suitable phase locking circuit. Clocks generated by clock unit 509, such as, e.g., internal clocks 514 and 515, may have varying frequencies dependent upon the needs of various functional blocks within a given device, such as device 502, for example. Clock unit 509 may, in some embodiments, be configured to stop the generation of internal clocks in response to control signals generated by a control circuit, such as, e.g., control circuit 510, or in response to the deactivation of a reference clock signal.

Control circuit 505 may be configured to monitor overall system performance and determine if requests for activation of low power modes within other devices can be granted. In some embodiments, control circuit 505 may receive such requests, as well as latency information, from an interface unit, such as, e.g., interface unit 504, coupled to a communication bus. Control circuit 505 may, in various embodiments, send a message to one or more external devices, acknowledging requests for low power mode activation. In some embodiments, control circuit 505 may be implemented as a general purpose processor configured to execute program instructions stored in a memory, while in other embodiments, control circuit 505 may be implemented as a dedicated state machine or sequential logic circuit.

In some embodiments, control circuit 510 may be configured to monitor a level of activity within device 502. Dependent upon the level of activity, control circuit 510 may, in some embodiments, send a message to another or host device, indicating that device 502 is idle, and that a low power mode may be activated. Such a message may be sent via communication bus 511 or through the use of dedicated signal wires coupled between devices 501 and 502. In some embodiments, the low power mode may include deactivating one or more functional blocks, such as, e.g., interface unit 507, within device 502. The functional blocks may be deactivated by stopping a clock signal (generated by clock unit 509), or by reducing a voltage level of an internal power supply to a voltage insufficient for the functional blocks to operate.

Control circuit 510 may, in other embodiments, send messages to another or host device indicating the latency, i.e., the time device 502 will require to resume operation after the low power mode has been activated. In some embodiments, different low power modes may be possible, and device 502 may require a different amount of time to resume normal operation from each of the various low power modes.

It is noted that the embodiment illustrated in FIG. 5 is merely an example. In other embodiments, different numbers of devices, and different internal configurations of devices are possible and contemplated.

Figure 6:
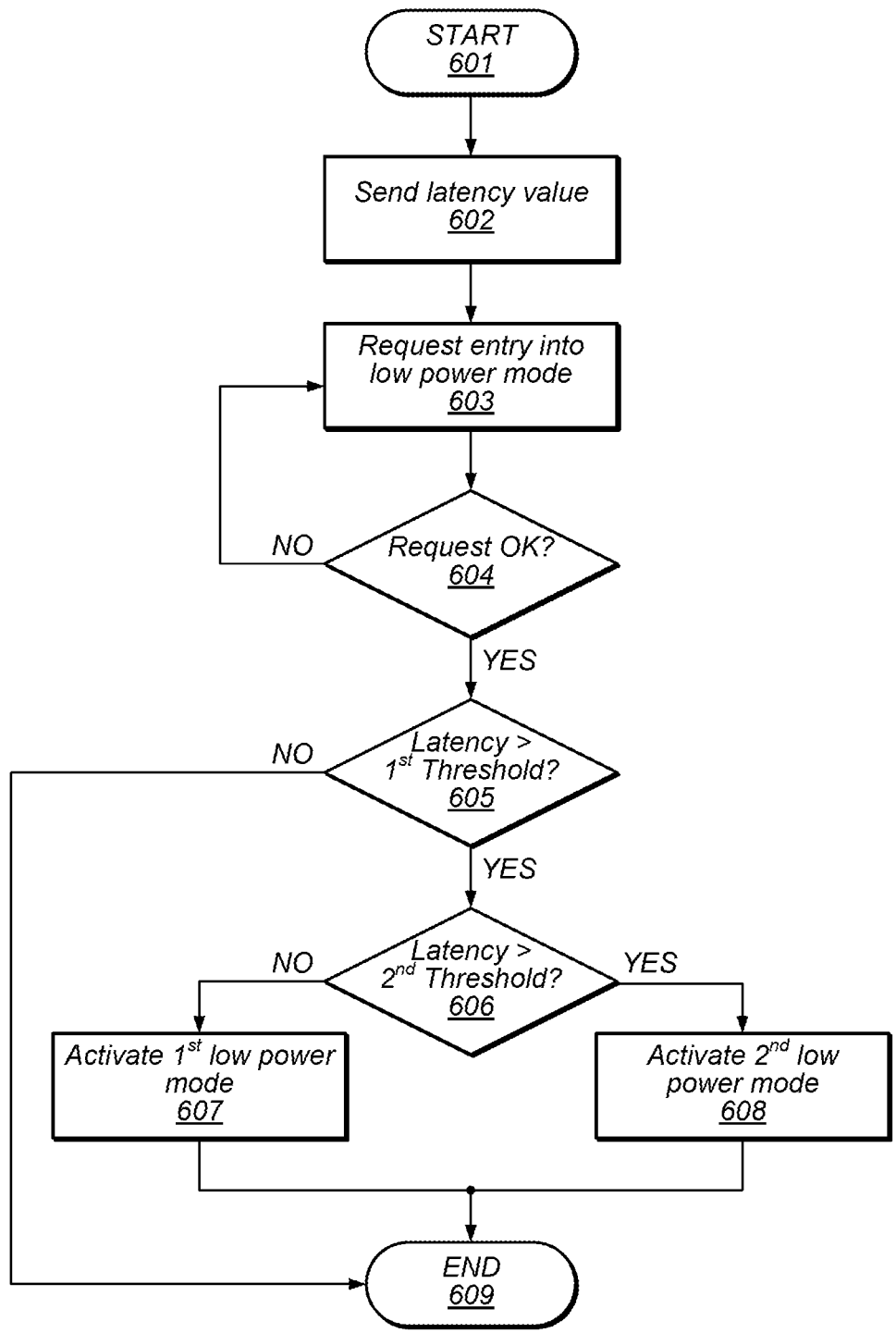
FIG. 6 depicts a flowchart illustrating an embodiment of a method activating low power modes.

A flowchart depicting an embodiment of a method activating low power modes of a computing system is illustrated in FIG. 6. Referring collectively to the flowchart illustrated in FIG. 6, and the embodiment of a computing system illustrated in FIG. 5, the method begins in block 601.

Device 502 may then send a latency value to device 501 (block 602). In some embodiments, the latency value may be sent as a message via communication bus 511 by interface unit 507. The message may include, in various embodiments, a latency value and a scale value, and control circuit 505 may multiply the received latency value by the scale value and employ the resulting product in further calculations and determinations. In various embodiments, control circuit 510 may determine the latency value dependent upon a level of activity of device 502.

Control circuit 510 may then request the activation of a low power mode of device 502 (block 603). In some embodiments, control circuit 510 may send a message to device 501 via communication bus 511, requesting the activation of a low power mode. In other embodiments, a dedicated signal wire may be used to make the request. Multiple low power modes may be available, and the selection of low power mode may dependent on a previously sent latency value. The method may then depend on whether computing system 500, and more particularly device 501, determines the request for activation of the low power mode is acceptable (block 604).

When device 501 determines that device 502 may not activate a low power mode, device 502 may continue to submit requests for activation of the low power mode (block 603). Control circuit 505 may, in various embodiments, determine if the request for activation of the low power mode is acceptable may check activity of computing system 500. In some embodiments, pending instructions or tasks may be evaluated to determine if computing resources provided by device 502 are required to complete any pending instructions or tasks.

When control circuit 505 determines that it is acceptable that device 502 enter low power mode, the method may then depend on the previously sent latency value (block 605).

When the latency value is less than a first threshold value, the method may conclude in block 609. When the latency value is greater than the first threshold value, the method may depend on a comparison of the latency value to a second threshold value (block 606). In some embodiments, the second threshold value may be greater than the first threshold value.

When the latency value is less than a second threshold value, a first low power mode may be activated (block 607). In some embodiments, the first low power mode may include disabling or stopping an interface clock, such as, e.g., interface clock 512 of system 500 as illustrated in FIG. 5. Clock unit 509 may, in various embodiments, disable or stop internal clock 514 in response to interface clock 512 being disabled. In some embodiments, the disabling of internal clock 514 may reduce the power consumption of interface unit 507, and therefore the power consumption of device 502. Once the first low power mode has been activated, the method may conclude in block 609.

Each of the first threshold value and the second threshold value may be stored in respective registers in device 501. The registers may, in some embodiments, include multiple data fields such as those depicted in register 400 as illustrated in FIG. 4. In some embodiments, control circuit 505 may retrieve a threshold number and a threshold scale factor from a register (not shown) and multiply the retrieved values to determine the a threshold value. Control circuit 505, or any other suitable logic circuit, executing program instructions stored in a memory, may initially set values stored in the register. The first threshold value and the second threshold value may, in various embodiments, be dependent upon one or more operating conditions of a computing system, such as, e.g., a level of activity.

When the latency value is greater than the second threshold, a second low power mode may be activated (block 608). In some embodiments, device 502 may consume less power while operating in the second low power mode than when operating in the first low power mode. In response to the activation of the second low power mode, clock unit 506 may disable or stop both interface clock 512 and system clock 513. Clock unit 509 may disable or stop internal clocks 514 and 515 responsive to the disabling of interface clock 512 and system clock 513. In some embodiments, disabling both internal clock 514 and internal clock 515 may reduce the power consumption of both interface unit 507 and logic block 508, thereby reducing the power consumption of device 502. In other embodiments, voltage levels of power supplies coupled to interface unit 507 and logic block 508 may be selectably reduced, thereby reduce the power consumption of device 502. The voltage levels may, in various embodiments, be lowered in lieu of disabling interface clock 512 and system clock 513, or in conjunction with disabling interface clock 512 and system clock 513 to further reduce the power consumption of device 502. Once the second low power mode has been activated, the method may conclude in block 609.

It is noted that some of the operations of the flowchart illustrated in FIG. 6 are depicted as being performed in a sequential fashion. In other embodiments, one or more of the operations may be performed in parallel.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   a clock generation circuit configured to generate a first clock signal and a second clock signal, wherein the first clock signal provides a timing reference to an interface unit of a device, and the second clock signal provides a timing reference to one or more logic blocks of the device;

a bus interface unit coupled to a communication bus, wherein the bus interface unit is configured to:

receive a message from the device, wherein the message includes a latency value, wherein the latency value is indicative of a time to resume powered operation; and receive a request signal from the device, wherein the request signal indicates a request from the device to activate a low power mode;

a control circuit configured to:

send an acknowledged signal to the device in response to a determination that the bus interface unit has received the message, wherein the acknowledged signal indicates that the low power mode of the device may be activated;

deactivate the first clock signal in response to a determination that the latency value is greater than a first threshold value and less than a second threshold value; and deactivate the first clock signal and the second clock signal responsive to a determination that the latency value is greater than the second threshold value.

2. The apparatus of claim 1, wherein the latency value includes a latency number and a scale factor.

3. The apparatus of claim 2, wherein to deactivate the first clock signal the control circuit is further configured to multiply the latency value by the scale factor.

4. The apparatus of claim 1, wherein the control circuit is further configured to send an acknowledged signal to the device responsive to receiving the request signal, wherein the acknowledged signal indicates that the low power mode of the device may be activated.

5. The apparatus of claim 4, wherein to receive the request signal, the bus interface unit is further configured to receive a request message via the communication bus.

6. The apparatus of claim 1, wherein the clock generation circuit includes a phase-locked loop (PLL).

7. A method for operating a computing system, comprising:

sending a first message from a first component of the computing system to a second component of the computing system, wherein the first message includes a latency value, wherein the latency value is indicative of a time to resume powered operation;

sending a request signal from the first component of the computing system to the second component of the computing system, wherein the request signal includes a request for the first component to activate a low power mode;

activating a first low power mode for the first component in response to a determination that the latency value is greater than a first threshold value and less than a second threshold value; and activating a second low power mode for the first component responsive to a determination that the latency value is greater than the second threshold value.

8. The method of claim 7, wherein activating the first low power mode comprises deactivating a first clock signal, wherein the first clock signal provides a timing reference to an interface unit of the first component of the computing system.

9. The method of claim 8, wherein activating the second low power mode comprises deactivating the first clock signal and a second clock signal, wherein the second clock signal provides a timing reference to one or more logic blocks of the first component of the computing system, and wherein the one or more logic blocks excludes the interface unit.

10. The method of claim 7, wherein the latency value includes a latency number and a scale factor.

11. The method of claim 10, wherein activating the first low power mode comprises multiplying the latency number by the scale factor.

12. A method for operating a computing system, comprising:

sending a first message from a first component of the computing system to a second component of the computing system, wherein the first message includes a latency value, wherein the latency values is indicative of a time to resume powered operation;

sending a request signal from the first component of the computing system to the second component of the computing system, wherein the request signal includes a request for the first component to activate a low power mode;

activating a first low power mode for the first component in response to a determination that the latency value is greater than a first threshold value and less than a second threshold value; and activating a second low power mode for the first component in response to a determination that the latency value is greater than the second threshold value;

wherein activating the first low power mode comprises deactivating a first clock signal, wherein the first clock signal provides a timing reference to an interface unit of the first component of the computing system;

wherein activating the second low power mode comprises reducing a voltage level of a power supply to one or more logic blocks of the first component of the computing system.

13. The method of claim 12, wherein activating the second low power mode further comprises deactivating a first clock signal, wherein the first clock signal provides a timing reference to an interface unit of the first component of the computing system.

14. The method of claim 13, wherein activating the second low power mode further comprises deactivating the first clock signal and a second clock signal, wherein the second clock signal provides a timing reference to the one or more logic blocks of the first component of the computing system, and wherein the one or more logic blocks excludes the interface unit.

15. A system, comprising:

a host configured to generate a first clock signal and a second clock signal; and a device coupled to the host via a communication bus, wherein the device is configured to:

receive the first clock signal and the second clock signal; and wherein the first clock signal provides a timing reference to an interface unit of the device, and the second clock signal provides a timing reference to one or more logic blocks of the device, wherein the one or more logic blocks excludes the interface unit;

send a first message to the host, wherein the first message includes a latency value, wherein the latency value is indicative of a time to resume powered operation; and send a request signal to the host, wherein the request signal includes a request for the device to activate a low power mode;

wherein the host is further configured to:
deactivate the first clock signal responsive to receiving the request signal and a determination that the latency value is greater than a first threshold value and less than a second threshold value; and
deactivate the first clock signal and the second clock signal in response to receiving the request signal and a determination that the latency value is greater than the second threshold value.

16. The system of claim 15, the host is further configured to acknowledge the request send by the device to activate the low power mode.

17. The system of claim 16, to send the request signal, the device is further configured to send a request message via the communication bus.

18. The system of claim 15, wherein the latency value includes a latency number and a scale factor.

19. The system of claim 18, wherein to deactivate the first clock signal, the host is further configured to multiply the latency number by the scale factor.

20. The system of claim 15, wherein the device comprises a phase-locked loop (PLL), wherein the PLL is configured to receive the second clock signal.

* * * * *